United States Patent
Cotton et al.

(10) Patent No.: US 9,904,425 B2
(45) Date of Patent: Feb. 27, 2018

(54) MEANDERING INTERCONNECT ON A DEFORMABLE SUBSTRATE

(71) Applicant: Nokia Technologies Oy, Espoo (FI)

(72) Inventors: Darryl Cotton, St. Ives (GB); Mark Allen, Cambridge (GB); Piers Andrew, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 126 days.

(21) Appl. No.: 14/890,175

(22) PCT Filed: May 10, 2013

(86) PCT No.: PCT/FI2013/050513
§ 371 (c)(1),
(2) Date: Nov. 10, 2015

(87) PCT Pub. No.: WO2014/181030
PCT Pub. Date: Nov. 13, 2014

(65) Prior Publication Data
US 2016/0132150 A1    May 12, 2016

(51) Int. Cl.
*G06F 3/044* (2006.01)

(52) U.S. Cl.
CPC .... *G06F 3/044* (2013.01); *G06F 2203/04102* (2013.01)

(58) Field of Classification Search
None
See application file for complete search history.

(56) References Cited

U.S. PATENT DOCUMENTS

| 2003/0086048 A1* | 5/2003 | Ukita | G02F 1/1345 349/149 |
| 2006/0012578 A1* | 1/2006 | Ohtake | G06F 1/1618 345/173 |
| 2007/0085963 A1* | 4/2007 | Huang | G02F 1/1345 349/152 |
| 2007/0195254 A1 | 8/2007 | Lee et al. | 349/149 |
| 2011/0006759 A1 | 1/2011 | Fukushima | 324/207.15 |
| 2011/0116215 A1* | 5/2011 | Chang | G02F 1/1339 361/679.01 |

FOREIGN PATENT DOCUMENTS

| CN | 1194252 C | 3/2005 |
| CN | 100399166 C | 7/2008 |
| CN | 101957704 A | 1/2011 |
| CN | 102171928 A | 8/2011 |
| CN | 102637100 A | 8/2012 |
| CN | 102750029 A | 10/2012 |
| EP | 2 487 567 A2 | 8/2012 |
| WO | WO 2007/008518 A2 | 1/2007 |
| WO | WO-2009/075577 A1 | 6/2009 |

* cited by examiner

*Primary Examiner* — Nicholas Lee
(74) *Attorney, Agent, or Firm* — Harrington & Smith

(57) ABSTRACT

An apparatus including a first plurality of first conductive lines; and a first meandering interconnect supported in a spaced relationship from a deformable substrate, wherein the first meandering interconnect includes a first multiplicity of meandering conductive lines each of which is electrically connected to one of the first plurality of first conductive lines.

20 Claims, 4 Drawing Sheets

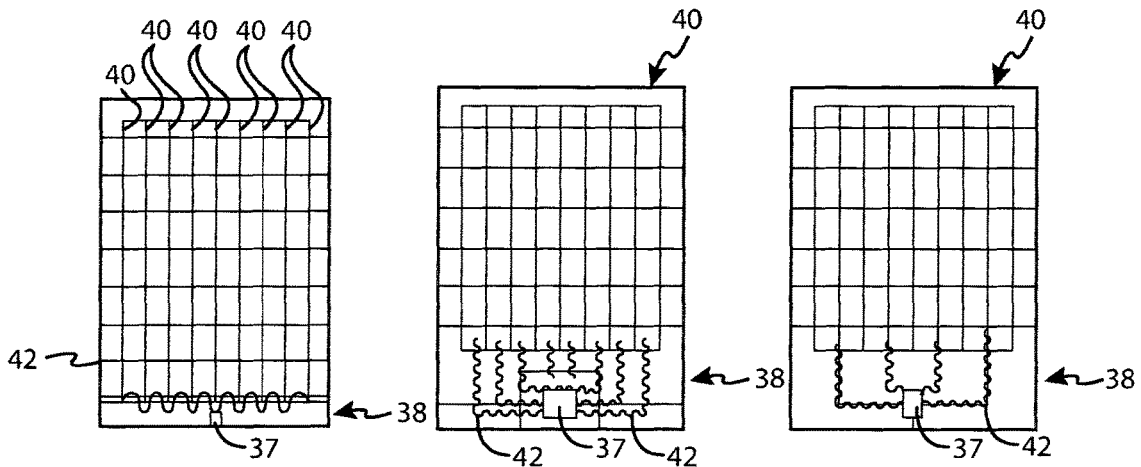
FIG. 7A  FIG. 7B  FIG. 7C
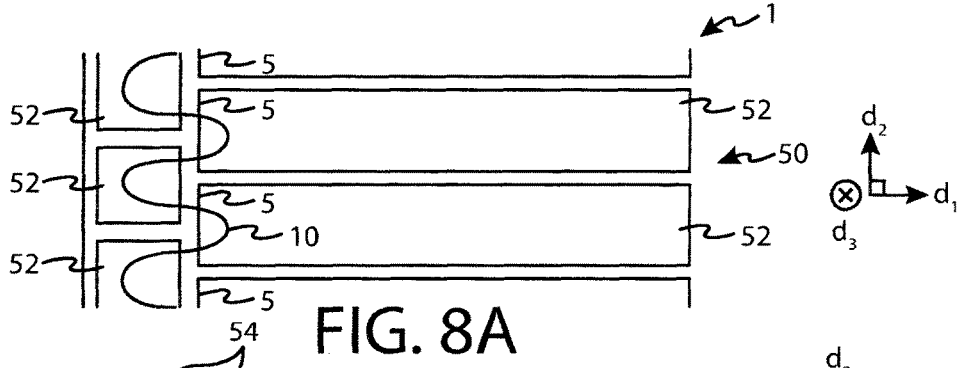
FIG. 8A
FIG. 8B
FIG. 9A
FIG. 9B
FIG. 9C

MEANDERING INTERCONNECT ON A DEFORMABLE SUBSTRATE

TECHNOLOGICAL FIELD

Embodiments of the present invention relate to an apparatus and a method. In particular, they relate to an apparatus for routing conductive paths effectively, particularly but not exclusively, where contortion of the routing is a requirement.

BACKGROUND

Conductive paths are commonly used to transfer electrical signals. It is common to route multiple electrical signals in parallel along physically parallel conductive paths.

A conductive path, depending upon application, may need to satisfy a number of simultaneous constraints.

For example, it may be desirable to have a low resistance to prevent resistive power losses.

For example, it may be desirable to have a low capacitance to prevent interference from capacitive coupling.

For example, it may be desirable to enable the conductive path to contort. Contortion is the deformation of a body by twisting and/or bending and/or stretching.

Increasing thickness of a conductive path may increase conductivity but it may also increase rigidity and decrease flexibility.

Increasing a width of a conductive path may increase conductivity but it may also increase capacitance.

BRIEF SUMMARY

According to various, but not necessarily all, embodiments of the invention there is provided an apparatus comprising: a first plurality of first conductive lines; and a first meandering interconnect supported in a spaced relationship from a deformable substrate, wherein the first meandering interconnect comprises a first multiplicity of meandering conductive lines each of which is electrically connected to one of the first plurality of first conductive lines.

According to various, but not necessarily all, embodiments of the invention there is provided a method comprising: supporting a first meandering interconnect in a spaced relationship from a deformable substrate, wherein the first meandering interconnect comprises a first multiplicity of meandering distinct conductive lines; and electrically connecting each of the meandering distinct conductive lines to one of a first plurality of first conductive lines.

BRIEF DESCRIPTION

Figure 1:
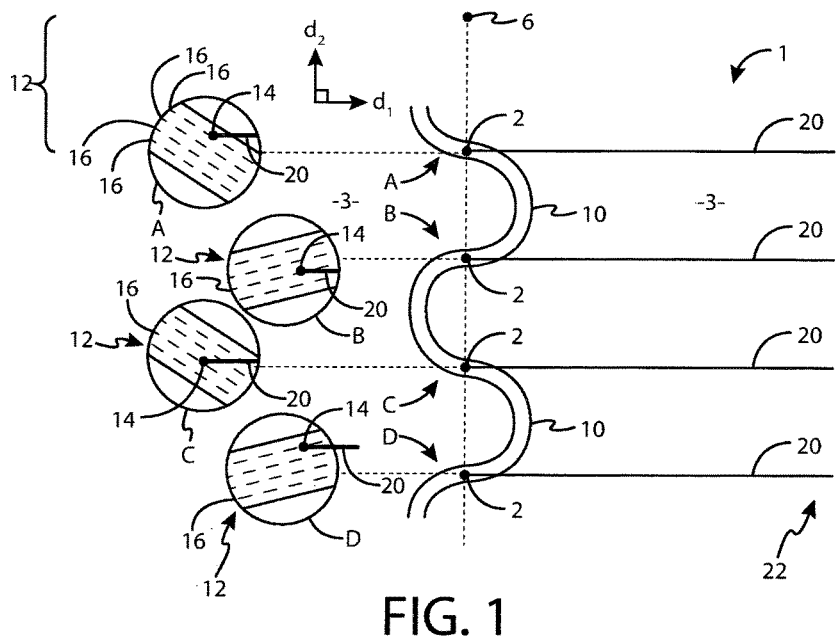
Figure 2:
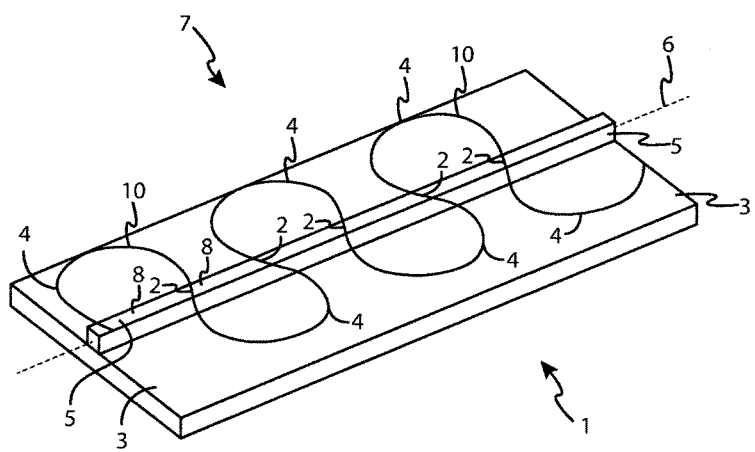
Figure 3:
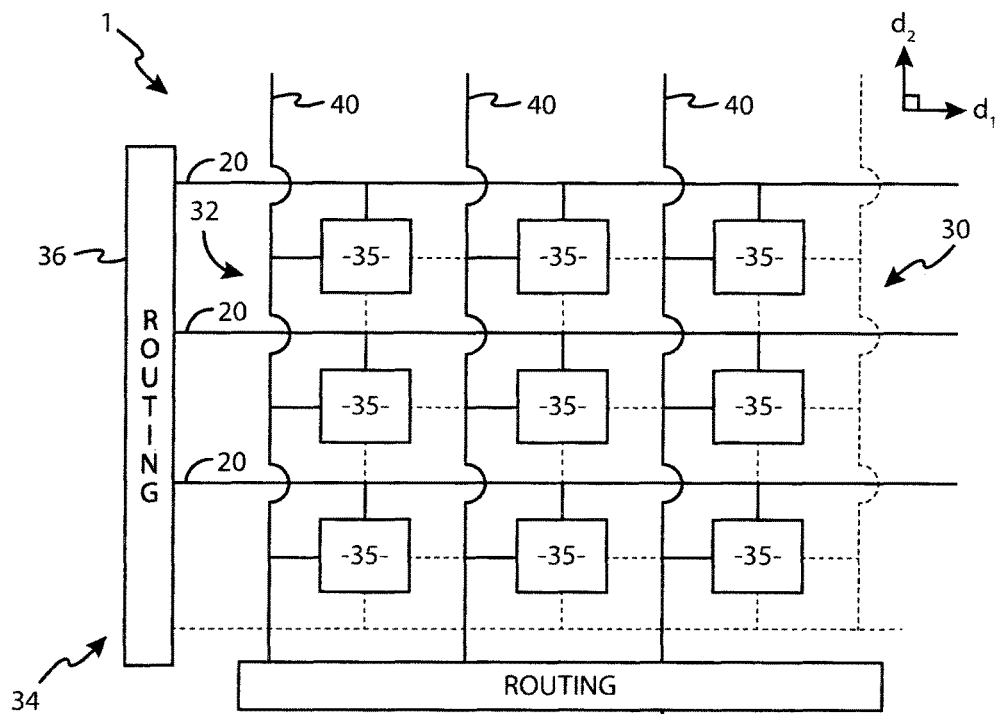
Figure 4A:
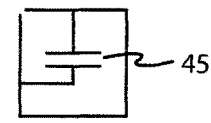
Figure 4B:
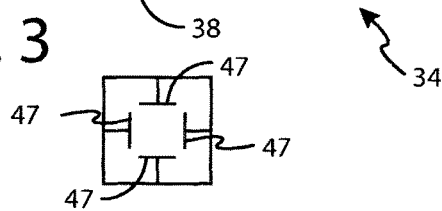
Figure 5:
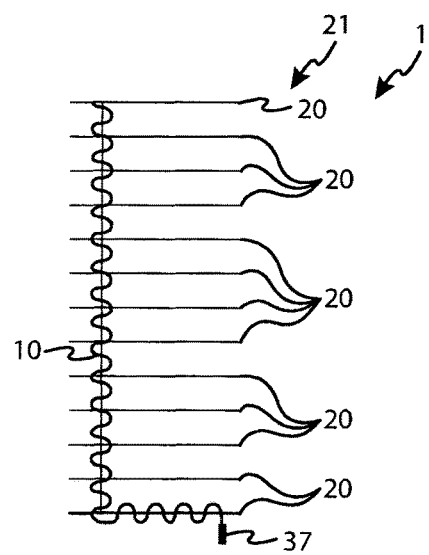
Figure 6:
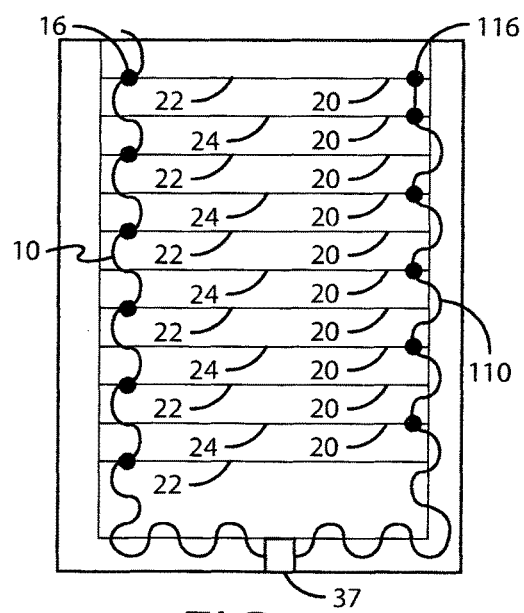
Figure 10:
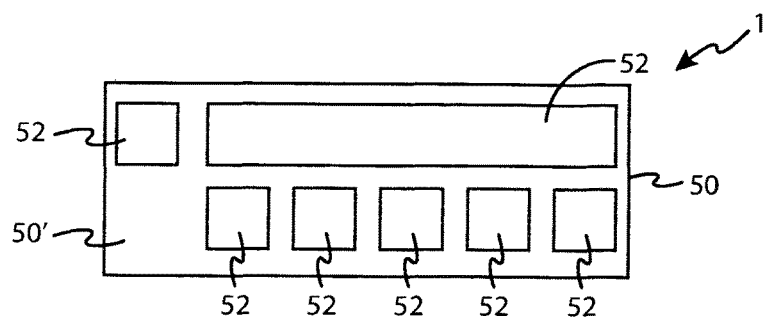

For a better understanding of various examples that are useful for understanding the brief description, reference will now be made by way of example only to the accompanying drawings in which:

FIG. 1 illustrates an example of an apparatus;
FIG. 2 illustrates in perspective view the apparatus;
FIG. 3 illustrates an example of the apparatus as part of a touch panel;
FIG. 4A illustrates an example of a capacitive cell of a touch panel;
FIG. 4B illustrates an example of a capacitive cell of a touch panel;
FIG. 5 illustrates the drive routing comprising one meandering interconnect;
FIG. 6 illustrates the drive routing comprising two meandering interconnects;
FIGS. 7A, 7B and 7C, illustrate examples of sense routing comprising one or more meandering interconnects;
FIGS. 8A and 8B are differently oriented cross-sectional views through cavities of the apparatus;
FIGS. 9A, 9B and 9C illustrate different implementations of the first conductive lines;
FIG. 10 illustrates an example of a stacked structure which comprises an upper housing that provides drive lines and a lower housing that provides sense lines; and
FIGS. 11A to 11D illustrates a method.

DETAILED DESCRIPTION

The Figures illustrate an apparatus 1 comprising: a first plurality 22 of first conductive lines 20; and a first meandering interconnect 10 supported in a spaced relationship from a deformable substrate 3, wherein the first meandering interconnect 10 comprises a first multiplicity 12 of meandering distinct conductive lines each of which is electrically connected to one of the first plurality 22 of first conductive lines 20.

In this document the term 'line' is used to denote an elongate conductive path that may be of any shape. In some but not necessarily all embodiments, the conductive path may lie within a flat plane and/or may be rectilinear.

In this document, contortion is deformation by twisting and/or bending and/or stretching. Resilient contortion implies that which is contorted stays in its contorted state while held in that state and returns to its equilibrium shape when released. The first meandering interconnect 10 may be resiliently contorted. The apparatus 1 may be resiliently contorted.

FIG. 1 illustrates an example of an apparatus 1 for routing electrical signals.

The apparatus 1 comprises a first plurality 22 of first conductive lines 20 and a first meandering interconnect 10 electrically connected to the conductive lines 20.

In this example, the first meandering interconnect 10 operates as a bus and comprises a first multiplicity 12 of meandering, parallel conductive lines 16. Each of the first multiplicity 12 of meandering, parallel conductive lines 16 is electrically connected to one of the first plurality 22 of first conductive lines 20. Magnified views A, B, C, D illustrate in detail portions of the first meandering interconnect 10 where electrical connection is made between conductive lines 16 and first conductive lines 20.

In view A, a first one of the conductive lines 16 is connected to a first one of the first conductive lines 20 via a via 14. A via 14 is a conductive interconnection between two parallel planes. It may be formed by any suitable means such as conductive adhesive, liquid metal, metal interconnect etc. In view B, a second one of the conductive lines 16 is connected to a second one of the first conductive lines 20 via a via 14. In view C, a third one of the conductive lines 16 is connected to a third one of the first conductive lines 20 via a via 14. In view D, a fourth one of the conductive lines 16 is connected to a fourth one of the first conductive lines 20 via a via 14.

The first meandering interconnect 10 is supported in a spaced relationship from a deformable substrate 3. This may be appreciated from the perspective view of an apparatus 1 in FIG. 2. In FIG. 2, the first conductive lines 20 are not illustrated for clarity but they would be present.

In the apparatus 1, the first meandering interconnect 10 meanders laterally in a first direction d1 and extends longitudinally in a second direction d2 orthogonal to the first direction d1.

The first meandering interconnect 10 is supported at intermittent support points 2 by a raised support 5 that is raised relative to the substrate 3. The raised support may comprise a single beam or a plurality of separate beams or posts, for example.

The first meandering interconnect 10 comprises one or more suspended loops 4 between adjacent support points 2. The loops are free-standing except where supported at the support points 2 and are suspended in separation from the substrate 3.

If the curve of a loop is approximated to an arc of a circle, the angle subtending the arc gives a measure of how curved the loop is. In FIG. 1, the loops subtend an angle less than 180 degrees whereas in FIG. 2 the loops subtend an angle greater than 180 degrees.

In these examples, but not necessarily all examples, the support points 2 are arranged rectilinearly along a longitudinal axis 6 that extends in the second direction d2.

In these examples, but not necessarily all examples, the support points 2 are arranged rectilinearly along a longitudinal axis 6 that extends in the second direction d2 with regular spaces 8 between them.

In these examples, but not necessarily all examples, the suspended loops 4 extend on either side of the longitudinal axis 6 in a suspension plane. From the perspective of a normal vector to the suspension plane, looking towards the suspended loops 4, and travelling in the direction of the longitudinal axis 6, he loops 4 on one side of the longitudinal axis 6 loop counter-clockwise, whereas the loops on the other side of the longitudinal axis 6 loop clockwise.

In these examples, but not necessarily all examples, the suspended loops 4 on either side of the longitudinal axis 6 have the same loop size.

In these examples, but not necessarily all examples, the suspended loops 4 on the same side of the longitudinal axis 6 have the same loop size.

In these examples, but not necessarily all examples, the suspended loops 4 have a pattern 7 that repeats in the longitudinal direction. In this example the repeat pattern 7 has 180 degree rotational symmetry about a centre point.

FIG. 3 illustrates an example of the apparatus 1 as part of a touch panel 30.

A touch panel 30 is a user input device that detects a user 'touch' input. The touch input may occur by touching the touch panel 30 using a grounded element (e.g. a human finger) or by bringing such a grounded element close to (but not touching) the touch panel 30.

The touch panel 30 is configured to detect a location within an active area 32 of the touch panel 30 at which the touch input occurred.

The illustrated example is a capacitive touch panel 30. The proximity of a conductor to the capacitive touch panel 30 changes the capacitance of a capacitance cell 35. This change in capacitance is detected using first conductive lines 20 as drive lines and using second conductive lines 40 as sense lines.

The drive lines 20 are arranged in parallel. They each extend in the first direction d1. The sense lines 40 are also arranged in parallel. They extend in the second direction d2, orthogonal to the first direction.

The drive lines 20 and sense lines 40 form a grid that is used to detect changes in capacitances in capacitive cells 35 positioned within the grid.

In another embodiment, as illustrated in FIG. 4A each capacitive cell 35 comprises a capacitor 45 that is addressed by a unique combination of drive line 20 and sense line 40. The value of the capacitance of the capacitive cell 35 may be measured by addressing the cell 35 and changes in capacitance caused by a user enabled input can be detected. The capacitor 45 may be a designed component or simply formed whether the drive line 20 and the sense line 40 cross.

In another embodiment, as illustrated in FIG. 4B, each capacitive cell 35 comprises multiple electrodes 47. These electrodes may be arranged as tiles in a tessellated pattern with narrow gaps between them. An electrode 47 connected to a drive line 20 forms a first capacitor with a neighbouring electrode 47 connected to a first neighbouring sense line 40 and forms a second capacitor with an electrode 47 connected to a second neighbouring sense line 40. The relative difference in the capacitances of the first capacitor and the second capacitor may be measured to detect differential changes in capacitance caused by a user touch input.

The touch panel 30 comprises routing 34 that lies outside the active area 32 of the touch panel 30. The routing 34 connects the drive lines 20 and sense lines 40 to processing circuitry. Drive routing 36 connects the drive lines 20 to the processing circuitry and sense routing 38 connects the sense lines 40 to the processing circuitry.

The drive routing 36 may comprise one or more meandering interconnects.

For example, the drive routing 36 may comprise a first meandering interconnect 10, as illustrated in FIGS. 1 and 2 that is configured to connect to all of the first conductive lines 20, which in this embodiment operate as drive lines. An example of this arrangement is illustrated in FIG. 5. The processing circuitry is provided by an integrated circuitry 37.

As an alternate example, the drive routing 36 may comprise a first meandering interconnect 10, as illustrated in FIGS. 1 and 2 at a first edge of the active area 32 and may comprise a second meandering interconnect 110, similar to the first meandering interconnect 10 illustrated in FIGS. 1 and 2, at a second edge of the active area 32 opposite the first edge.

The first meandering interconnect 10 is configured to connect to some of the drive lines 20 and the second meandering interconnect 110 is configured to connect to the remaining drive lines 20

An example of this arrangement is illustrated in FIG. 6. The processing circuitry is provided by an integrated circuitry 37.

In this example, the second meandering interconnect 110 is supported in a spaced relationship from the deformable substrate 3 (similar to the arrangement illustrated in FIGS. 1 & 2). The second meandering interconnect 110 comprises a second multiplicity of meandering conductive lines 116 (similar to the arrangement illustrated in FIG. 1). The second meandering interconnect 110 meanders laterally in a first direction d1 and extends longitudinally in a second direction d2 orthogonal to the first direction d1 and is supported at intermittent support points 2 (similar to the arrangement illustrated in FIGS. 1 & 2)

The first conductive lines 20 can be logically divided into a first set 22 of first conductive lines 20 each of which is electrically connected to a different conductive line 16 of the first meandering interconnect 10 and a second set 24 of first conductive lines 20 each of which is electrically connected to a different conductive line 116 of the second meandering interconnect 110.

Alternate lines (e.g. . . . n-2 th, nth, n+2th . . . ) of the first conductive lines 20 electrically connect to the first meandering interconnect 10.

Different alternate lines (e.g. . . . n−3 th, n−1 th, n+1th . . . ) of the first conductive lines 20 electrically connect to the second meandering interconnect 110.

Referring to FIGS. 7A, 7B and 7C, the sense routing 38 may also comprise one or more meandering interconnects 42. Such meandering interconnects 42 may be supported in a spaced relationship from the deformable substrate 3.

Referring to FIG. 7A, the meandering interconnect 42 meanders in the second direction d2 and extends in the first direction d1 orthogonal to the second direction d2. The meandering interconnect 42 is supported at intermittent support points 2 by a raised support (similar to the arrangement illustrated in FIGS. 1 & 2). The meandering interconnect 42 comprises meandering conductive lines (similar to the arrangement illustrated in FIG. 1) each of which is connected to a sense line 40.

FIGS. 8A and 8B illustrate an example of the apparatus 1.

FIG. 8A is a cross-sectional view from the same orientation as FIG. 1 along a third direction d3 orthogonal to the first and second directions d1, d2 (d1×d2=−d3). A plurality of first conductive lines 20 are arranged in parallel. Each first conductive line 20 extends in the first direction d1 and is orthogonal to the second direction d2.

FIG. 8B is a cross-section view of the same apparatus 1 illustrated in FIG. 8A but from along the second direction d2

In FIGS. 8A and 8B the apparatus 1 comprises a housing 50. The housing 50 is resiliently deformable and provides the deformable substrate 3. It may be formed from elastomeric material.

The housing 50 comprises a plurality of pairs 54 of cavities 52.

Each cavity 52 of each pair 54 of cavities 52 is arranged laterally side-by-side in the first direction d1 with an off-set in the direction d2. A first cavity is to the right and a second cavity is to the left.

The pairs 54 of cavities 52 are arranged longitudinally pair-wise along the second direction d2 but with an off-set in the direction d2 such that the boundaries between adjacent first cavities 52 do not support the loops of the first meandering interconnect 10 and such that the boundaries between adjacent second cavities 52 do not support the loops of the first meandering interconnect 10.

Each of the plurality of first conductive lines 20 is associated with a pair 54 of cavities 52. Each of the first cavities 52 may be a conduit for a first conductive line 20.

The first meandering interconnect 10 meanders, at least partially through, each of the cavities 52 comprising the plurality of pairs 54 of cavities 52. As described in relation to FIGS. 1 and 2 it electrically connects to each of the first conductive lines 20.

FIGS. 9A, 9B and 9C illustrate alternative implementations.

In FIG. 9A, the cavities 52 are separately sealed cavities. The first cavities 52 comprise conductive liquid 60. The conductive liquid may, for example, be a liquid metal (e.g. eutectics of Ga, In, Sn , Sb, Sn such as eutectic gallium-Indium (eGaIn)), an ionic liquid or a solute.

The separated portions 62 of the conductive liquid 60 within the plurality of separately sealed first cavities 52 provide the first conductive lines 20. Thus the separate cavities 52 separate the conductive liquid 60 to form a plurality of separate conductive lines 20.

In FIG. 9B, the first cavities 52 comprise a conductive interconnect material that provides the first conductive lines 20. The conductive interconnect material electrically connects directly to the first meandering interconnect 10.

In FIG. 9C, the first cavities 52 comprise a conductive interconnect material that provides the first conductive lines 20. The conductive interconnect material extends into the second cavities 52. The second cavities 52 comprise conductive liquid 60. The conductive liquid may, for example, be a liquid metal (e.g. eutectics of Ga, In, Sn , Sb, Sn such as eutectic gallium-Indium (eGaIn)), an ionic liquid or a solute.

The first conductive lines 20 therefore electrically connect indirectly, via the conductive liquid 60, to the first meandering interconnect 10.

The separated portions 62 of conductive liquid 60 within the plurality of separately sealed cavities 52 provide an interface 70 between the first conductive lines 20 and the first meandering interconnect 10.

FIG. 10 illustrates a stacked structure which comprises an upper housing 50 that provides drive lines 20 and is configured, for example, as described with reference to FIGS. 8A, 8B, 9A, 9B and 9C and a lower housing 50' that provides the sense lines 40. The drive lines 20 and sense lines 40 therefore occupy different planes. The ordering of the upper housing 50 and lower housing 50' may be reversed.

The lower housing 50 may be similar to the upper housing except that it is rotated through 90 degrees.

Both the upper housing and the lower housing may define sealed cavities 52 and some, all or none of those cavities 52 may comprise conductive liquid.

The drive lines 20 may be connected as previously described.

The sense lines 40 may be connected as previously described.

FIGS. 11A to 11D illustrates a method 90.

The method 90 comprises supporting a first meandering interconnect 10 in a spaced relationship from a deformable substrate 3, wherein the first meandering interconnect 10 comprises a first multiplicity 12 of meandering distinct conductive lines; and electrically connecting each of the meandering distinct conductive lines to one of a first plurality 22 of first conductive lines 20.

Figure 11A:
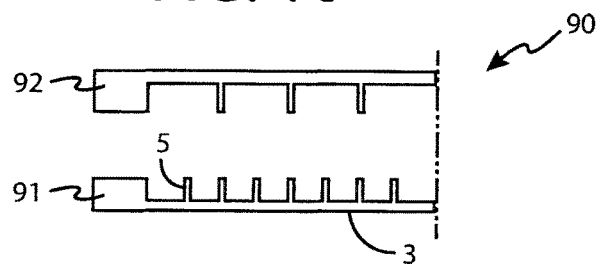

In more detail, the illustrated example of the method 90 comprises:

As illustrated in FIG. 11A, the method 90 comprises moulding elastomer to form a first lower housing part 91 and moulding elastomer to form a second upper housing part 92. The housing parts 91, 92 are resiliently contortable and may be formed from any suitable material. Examples, polyurethane, silicone elastomers, e.g. polydimethylsiloxane According to a first option, the first conductive lines 20 are defined on the upper surface of the lower housing part 91.

According to an alternative option, the first conductive lines 20 are defined later by injection of liquid conductor 60.

The first meandering interconnect 10 is fabricated. It may, for example, be formed by patterning a metal layer on a release substrate, covering the patterned metal layers with a protective rigid layer and separating the rigid protective layer with attached patterned metal as the first meandering interconnect 10.

The first meandering interconnect 10 may be fabricated using well-know "flexible printed circuit" technology. Thereafter, the conductors (copper for example) and the supporting substrate (polyimide for example) below and/or above the conductors are cut out or otherwise patterned into the shape of the meandering line comprising one or several conductive lines.

In another example, the meandering interconnect 10 may comprise indium tin oxide (ITO), aluminium zinc oxide (AZO), or other similar transparent conductive oxides, or carbon nanotubes (CNT), metal nanowires or other transparent conducting materials on a substrate (poly(ethylene terephthalate PET for example) patterned into the meander shape.

The first meandering interconnect 10 is supported in a spaced relationship from a deformable substrate 3 of the lower contortable housing part 91.

Figure 11B:
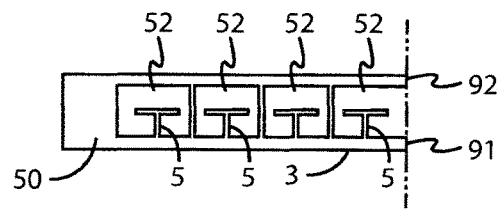

Referring to FIG. 11B, the first lower housing part 91 and the second upper housing part 92 are joined together to form a housing 50 for the first meandering interconnect 10.

The first meandering interconnect 10 is supported by at least portions of the housing 50 and is at least partially suspended in one or more cavities 52 formed between the first and second housing parts 91, 92.

The first lower housing part 91 comprises one or more lower supports 5 extending upwards, and the first meandering interconnect 10 is supported on the one or more lower supports 5.

The second upper contortable housing part 92 may comprise one or more upper supports (not illustrated in this figure) extending downwards. The lower contortable housing part 91 and the upper contortable housing part 92 are joined together such that the one or more lower supports 5 and the one or more upper supports are aligned, fixing the first meandering interconnect 10 between the one or more lower supports 5 and the one or more upper supports The combination of the aligned lower supports 5 and upper supports forms a wall between cavities 52 (see FIG. 8B).

Figure 11C:
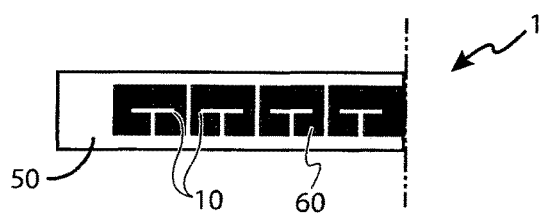
Figure 11D:
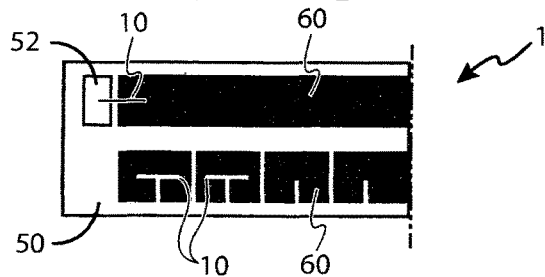

FIG. 11C illustrates an optional stage of injecting conductive liquid 60 to form the first conductive lines 20 (FIG. 9A) or interfaces 70 to the first conductive lines 20 (FIG. 9C). The stage is optional if first conductive lines 20 have already been defined and connected to the first meandering interconnect 10 (FIG. 9B).

The stages illustrated in FIGS. 11A to 11C may then be repeated to provide second conductive lines 40, orthogonal to the first conductive lines 20 and providing capacitance touch detectors 35 connected to the first conductive lines 20 and second conductive lines 40.

The term 'meander' is used to designate a winding path, alternate terms of the same intended meaning include 'serpentine', 'looped' etc.

Operationally coupled and any number or combination of intervening elements can exist (including no intervening elements). The term 'connected' in this document may relate to physical direct connection or operationally coupled.

As used here 'module' refers to a unit or apparatus that excludes certain parts/components that would be added by an end manufacturer or a user. The apparatus 2 may be a module, for example, it may be a touch panel module or a module for forming a touch panel.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a first plurality of first conductive lines; and
a first meandering interconnect supported in a spaced relationship from a deformable substrate, wherein the first meandering interconnect comprises a first multiplicity of meandering conductive lines each of which is electrically connected to one of the first plurality of first conductive lines.

2. The apparatus as claimed in claim 1, wherein the first meandering interconnect provides routing, outside an active area of a touch panel comprising at least portions of the first conductive lines.

3. The apparatus as claimed in claim 1, wherein the first meandering interconnect meanders laterally in a first direction and extends longitudinally in a second direction orthogonal to the first direction.

4. The apparatus as claimed in claim 1, wherein the first meandering interconnect is supported at intermittent support points.

5. The apparatus as claimed in claim 4, wherein the first meandering interconnect comprises one or more suspended loops between adjacent support points.

6. The apparatus as claimed in claim 4, wherein the first meandering interconnect is supported at intermittent support points by one or more raised beams.

7. The apparatus as claimed in claim 4, wherein the support points are arranged rectilinearly along a longitudinal axis.

8. The apparatus as claimed in claim 7, wherein the first meandering interconnect comprises suspended loops on either side of the longitudinal axis and has a repeat pattern in the longitudinal direction.

9. The apparatus as claimed in claim 4, wherein the intermittent support points are regularly spaced.

10. The apparatus as claimed in claim 1, wherein each of the first multiplicity of meandering distinct conductive lines is electrically connected to one of the first plurality of first conductive lines via a selectively formed via.

11. The apparatus as claimed in claim 1, comprising a housing having a plurality of cavities, wherein the plurality of cavities are arranged longitudinally such that each of the plurality of first conductive lines is associated with a cavity and wherein the first meandering interconnect meanders, at least partially through, the plurality of cavities.

12. The apparatus as claimed in claim 11, wherein at least some of the plurality of cavities are separately sealed cavities comprising conductive liquid.

13. The apparatus as claimed in claim 12, wherein separated portions of the conductive liquid within the plurality of separately sealed cavities provide the first conductive lines.

14. The apparatus as claimed in claim 12, wherein the separated portions of conductive liquid within the plurality of separately sealed cavities provide an interface between the first conductive lines and the first meandering interconnect.

15. The apparatus as claimed in claim 1, comprising a housing having a plurality of pairs of cavities, wherein each cavity of each pair of cavities is arranged laterally and the pairs of cavities are arranged longitudinally such that each of the plurality of first conductive lines is associated with a pair of cavities and wherein the first meandering interconnect meanders, at least partially through, each of the cavities comprising the plurality of pairs of cavities.

16. The apparatus as claimed in claim 15, wherein a first cavity of each of the plurality of pairs cavities is a sealed cavity comprising conductive liquid providing the first conductive lines.

17. The apparatus as claimed in claim 15, wherein a second cavity of each of the plurality of pairs cavities is a sealed cavity comprising conductive liquid wherein the conductive liquid within the plurality of cavities provides an interface between the first conductive lines and the first meandering interconnect.

18. The apparatus as claimed in claim 1 wherein the housing is deformable and provides the deformable substrate.

19. The apparatus as claimed in claim 1, comprising:
second conductive lines; and
one or more meandering interconnects supported in a spaced relationship from the deformable substrate, electrically connected to the second conductive lines.

20. A method comprising:
supporting a first meandering interconnect in a spaced relationship from a deformable substrate, wherein the first meandering interconnect comprises a first multiplicity of meandering distinct conductive lines; and
electrically connecting each of the meandering distinct conductive lines to one of a first plurality of first conductive lines.

\* \* \* \* \*